United States Patent Office 3,249,494
Patented May 3, 1966

3,249,494
**COMBATING TERMITES WITH *ASPERGILLUS FLAVUS***
Anders E. Lund, Pitcairn, Pa., assignor to Koppers Company, Inc., a corporation of Delaware
No Drawing. Filed Jan. 29, 1963, Ser. No. 254,600
3 Claims. (Cl. 167—22)

This invention relates generally to termite control and more particularly to the biological control of termites.

Heretofore, it has been customary to rely on chemical agents of various types in an effort to control the infestation of building structures by termites. The disadvantage, however, is that only those termites which contact or perhaps eat the chemical are killed thereby. Those termites which, by chance, contact the chemical die; but they may actually constitute only a small portion of the termite colony.

It has long been known that certain species of living organisms can live upon, disease and kill other species. A balance of nature is established and maintained unless disturbed by outside agents. It has now been found, in accordance with this invention, that by biological means, an entire termite colony may be killed and termite infestation stopped or prevented by exposing termites to a species of the common mold of the genus, Aspergillus.

Molds of the genus Aspergillus are widely found in nature. The species *flavus* which has been found to be particularly lethal to termites is a well-known widely used mold for biochemical operations. It is present in most agricultural seeds where it is often responsible for the spoilage of the seeds stored in bulk. The Japanese have long used the mold *Aspergillus flavus* in the making of wine from rice.

Quite surprisingly, therefore, it was found that exposure to the mold rapidly kills termites. Termite mortality averaged 45% after two days of exposure to *Aspergillus flavus* Link ex Fries; 80% after three days; and 100% after four days of exposure to the mold.

The mechanism of the antagonism of the mold to the termite is not known.

A great advantage of this invention is that the infection of only a few of the termites with the mold is sufficient to destroy the colony. The mold rapidly spreads throughout the colony killing the king and queen termite, as well as the workers, soldiers, and nymphs. The nature and habits of the termites aid in such biological extermination. Termites have a rigid caste system comprised mainly of the reproductive, the worker, and the soldier. The king, queen, and soldiers have either toothless jaws or poorly developed jaw muscles and so must be fed by nymphs and workers. Termites also clean themselves by licking or grooming one another. While the grooming is going on, the termites exchange nourishment by mouth. If a termite accidentally bites the termite being groomed thereby causing a droplet of body fluid to exude, it may excite the groomer to cannibalism and the groomed individual may be eaten. Weak, diseased, and dead termites are frequently (commonly) eaten. This grooming helps disseminate the mold throughout the colony.

Because termites are, by nature secret and hidden and because of the grooming and cannibalistic nature, the length of life of a termite is difficult to determine. It has been estimated that the king and queen may live for from ten to twenty-five years. It is known that it takes about eighteen days for a termite to starve to death. In accordance with this invention, termites exposed to the mold, *Aspergillus flavus*, averaged 45% mortality after two days; 80% mortality after three days; and 100% mortality after four days. It has been observed that after exposure to the mold, *Aspergillus flavus*, the legs of the termite assume a green coloration which then spreads to the head and back. The termite appears to undergo muscular disorder; the termite sickens, weakening to the point of vague spasmodic jerking of the extremities. Eventually, the termite turns green and becomes a gel-like mass.

As a practical application of this invention for the control of termites in building structures, the ground may be sprayed with a dilute concentration of the mold, and thereafter, the slab for the building structure may be constructed on this ground. Under these conditions, the mold will keep indefinitely until a favorable condition for its regeneration arises such, for example, as the presence of termites. As another application, the termite tunnels of a building already infested with termites can be inoculated or contaminated with the mold, and the termites contact it and thereafter spread the mold throughout the colony.

Using common bioengineering principles, the mold can be provided as a broth or a powder for spraying and dusting applications (in or about the building structures). The selection of a particular vehicle depends upon the mode of application desired. For application as a dust, the composition is in a dry powdered form with the usual inert powdered vehicle material, such as clay, talc, lime, and the like. For spraying, of course, the vehicle must be liquid. Other termiticides that are compatible with the mold may be used in conjunction with the vehicle.

As an illustration of the rapid mortality caused to termites by the mold *Aspergillus flavus*, eighteen termites (*Reticulitermes flavipes*) were equally distributed among the three sterile petri dishes (six to a dish). Dry filter paper was placed in one dish as a control. Filter paper contaminated with the mold, *Aspergillus flavus*, was placed in each of the other two dishes. After three days, the termites in the control dish were healthy and vigorous; but all six termites in one of the dishes containing the *Aspergillus flavus* were dead, and four of the six termites in the second dish that contained the mold were dead.

I claim:
1. A method of combating termites which comprises exposing termites to the mold *Aspergillus flavus*.
2. A method of controlling and preventing termite infestation of building structures which comprises applying the mold *Aspergillus flavus* to the soil around the building structure.
3. A method of controlling termite infestation of building structures which comprises inoculating the area of the termite colony with the mold *Aspergillus flavus*.

References Cited by the Examiner

Beal, Jour. of Insect Pathology, vol. 4, December 1962, pages 488–489.
Chem. and Eng. News, December 22, 1958, vol. 36, No. 51, p. 15.
Hanna, Handbook of Agricultural Chemicals, 2nd ed., 1958, pages 410–412.
Hilgardia, vol. 23, No. 1, May 1954, pages 1–23 (pages 1–3 relied on).
Pfizer, Handbook of Microbial Metabolites, 1961, pages 498, 499.
Science, vol. 129, No. 3348, February 27, 1959, pages 537–544.
Washington Daily News, April 7, 1959, page 3.

JULIAN S. LEVITT, *Primary Examiner.*
STANLEY J. FRIEDMAN, *Assistant Examiner.*